United States Patent
Epstein et al.

(10) Patent No.: US 7,460,304 B1
(45) Date of Patent: Dec. 2, 2008

(54) THERMAL VISION MASK

(76) Inventors: Jay F. Epstein, 16141 E. Duran Blvd., Loxahatchee, FL (US) 33470; Halie Epstein, 16141 E. Duran Blvd., Loxahatchee, FL (US) 33470

( * ) Notice: Subject to any disclaimer, the term of this patent is extended or adjusted under 35 U.S.C. 154(b) by 0 days.

(21) Appl. No.: 11/716,897

(22) Filed: Mar. 12, 2007

(51) Int. Cl.
*G02B 27/10* (2006.01)

(52) U.S. Cl. .................. 359/618; 359/356; 359/630; 250/330; 2/6

(58) Field of Classification Search .................. 2/7, 2/6; 250/338.1, 338, 330; 359/618, 630, 359/356

See application file for complete search history.

(56) References Cited

U.S. PATENT DOCUMENTS

| | | | |
|---|---|---|---|
| D255,283 S | 6/1980 | Piche | |
| 5,089,914 A | 2/1992 | Prescott | |
| 5,949,582 A * | 9/1999 | Coombs | 359/630 |
| 6,016,160 A | 1/2000 | Coombs et al. | |
| 6,023,288 A | 2/2000 | Coombs et al. | |
| 6,255,650 B1 | 7/2001 | Warner et al. | |
| 6,606,114 B1 * | 8/2003 | Gordon et al. | 348/64 |
| 2002/0053101 A1 * | 5/2002 | Slack | 2/7 |
| 2003/0015662 A1 * | 1/2003 | Yang et al. | 250/330 |
| 2003/0122958 A1 | 7/2003 | Olita et al. | |
| 2005/0127296 A1 * | 6/2005 | Reilly et al. | 250/330 |

* cited by examiner

*Primary Examiner*—Scott J. Sugarman
*Assistant Examiner*—Vipin M Patel

(57) ABSTRACT

The invention is a thermal imaging camera lens that has an LCD display mounted on the opposing side of the camera, which is integrated into a fire mask visor. The fire mask visor is used in conjunction with an oxygen mask. The thermal imaging lens is directed along the same line of sight as the user's, which provides for greater ease of use in hazardous situations. However, the thermal imaging lens can be rotated to a desired angle and line of sight of the end user. A sealant can be applied to the perimeter of the thermal imaging system housing and the visor to prevent the introduction of smoke and/or hazardous gases from entering the interior side of the visor.

1 Claim, 3 Drawing Sheets

THERMAL VISION MASK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to a thermal camera and LCD display arrangement and more specifically to the application of said invention to the surface of a visor when used in conjunction with an oxygen supply mask.

Thermal imaging devices have found particularly useful in firefighting and search and rescue operations as they enable the end user to see through the dark or thick smoke.

B. Discussion of the Prior Art

The Olita et al. Patent Application Publication (U.S. Pub. No. 2003/0122958) discloses a fire fighter's helmet which has a thermal imaging system mounted thereon. However, the thermal imaging device is mounted on the helmet and requires a display to be angled down to the user's eyesight, as opposed to a thermal imaging lens that has an LCD screen on the backside of which it is mounted to the actual visor.

The Prescott patent (U.S. Pat. No. 5,089,914) discloses a thermal camera which is mounted within a helmet. However, the arrangement of the image projection device under this patent is in the interior of the helmet.

The Coombs et al. patent (U.S. Pat. No. 6,016,160), and the Gordon et al. patent (U.S. Pat. No. 6,606,114) disclose a combination head-protective helmet which includes a cap and an outwardly extending brim, and a thermal imaging apparatus which includes an infrared camera for producing an infrared image of a scene or object and a display system which generates a visible image of the scene or object. However, the thermal imaging apparatus and display system are hingedly mounted to the top of the helmet and fold down over the line of sight of the end user, as opposed to an infrared camera with LCD display that mount to a visor that does not require a helmet.

The Warner et al. patent (U.S. Pat. No. 6,255,650) discloses an extreme temperature and radiometry and imaging apparatus which includes an infrared camera. However, this device wraps around the head or helmet of the end user as opposed to mounting to the visor of an oxygen delivery mask. Furthermore, the device under this patent does not utilize an infrared camera that is mounted to the opposite side of the LCD display screen.

The Coombs et al. patent (U.S. Pat. No. 6,023,288) discloses another firefighter's helmet which has a thermal imaging apparatus. However, the device under this patent a thermal imaging lens that attaches to the rear of the helmet and can be bended around said helmet to point the lens in the direction that the end user wishes to view a thermal image, as opposed to a thermal lens that mounts to the surface of a visor.

The Piche patent (U.S. Pat. No. Des. 255,283) illustrates a design for a fireman's helmet.

In light of the above discussed prior art there is a need for a thermal vision mask in which the thermal lens is mounted onto and projects the thermal image onto the surface of the visor.

BRIEF SUMMARY OF THE INVENTION

The invention is a thermal imaging camera lens that has an LCD display mounted on the opposing side of the camera, which is integrated into a fire mask visor. The fire mask visor is used in conjunction with an oxygen mask. The thermal imaging lens is directed along the same line of sight as the user's, which provides for greater ease of use in hazardous situations.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
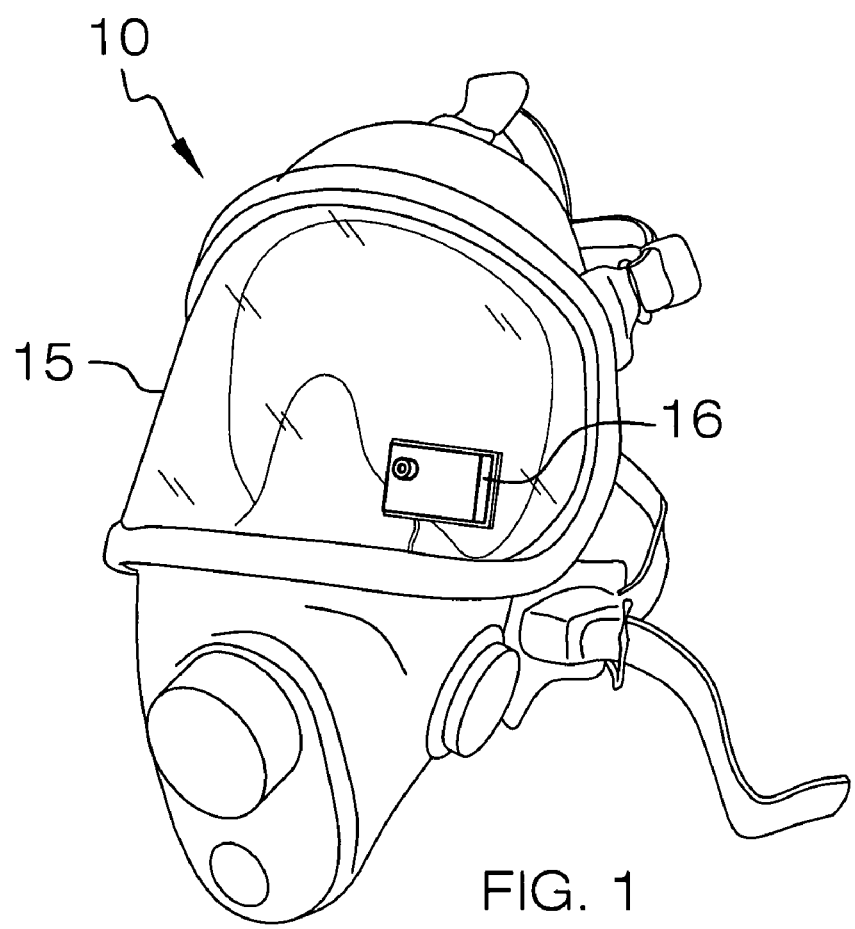
FIG. 1 illustrates an isometric front view of the invention installed.
Figure 2:
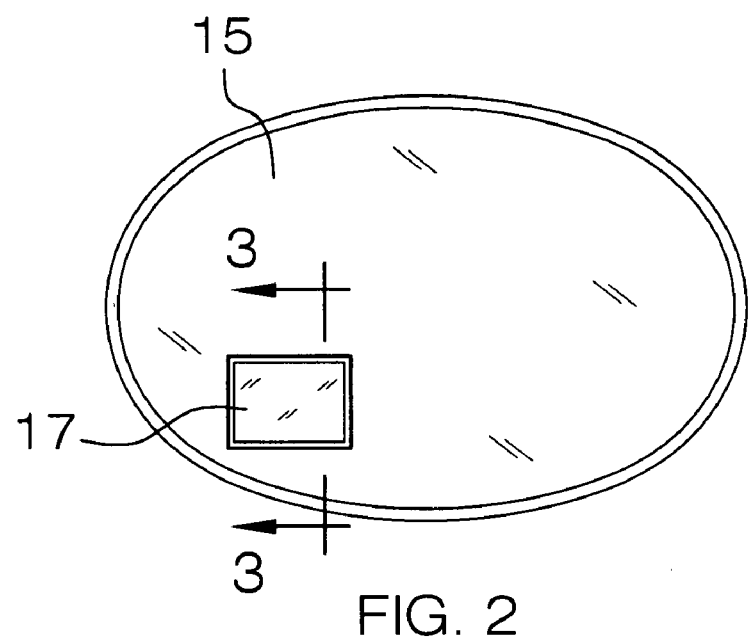
FIG. 2 illustrates rear side view of the invention.
Figure 3:
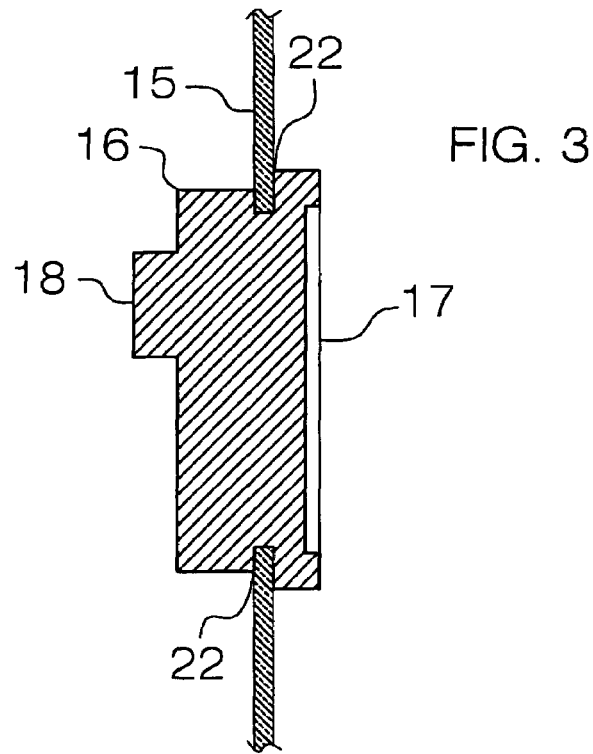
FIG. 3 illustrates a cross-sectional view along line 3-3.
Figure 4:
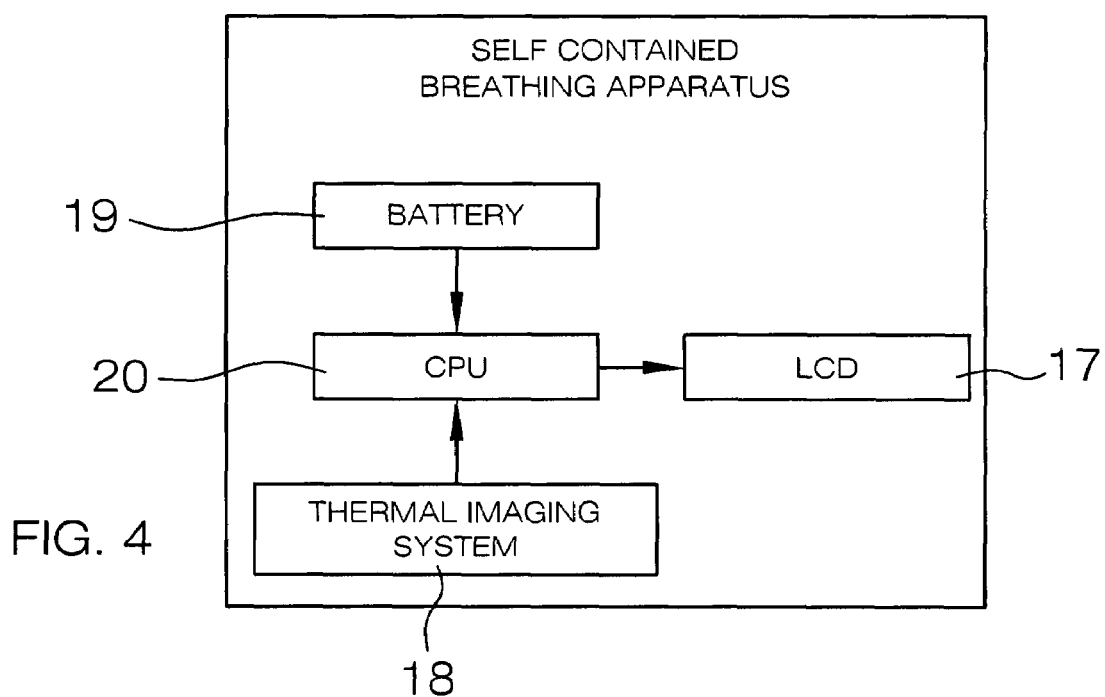
FIG. 4 illustrates a wiring diagram of the various components that make up the invention.
Figure 5:
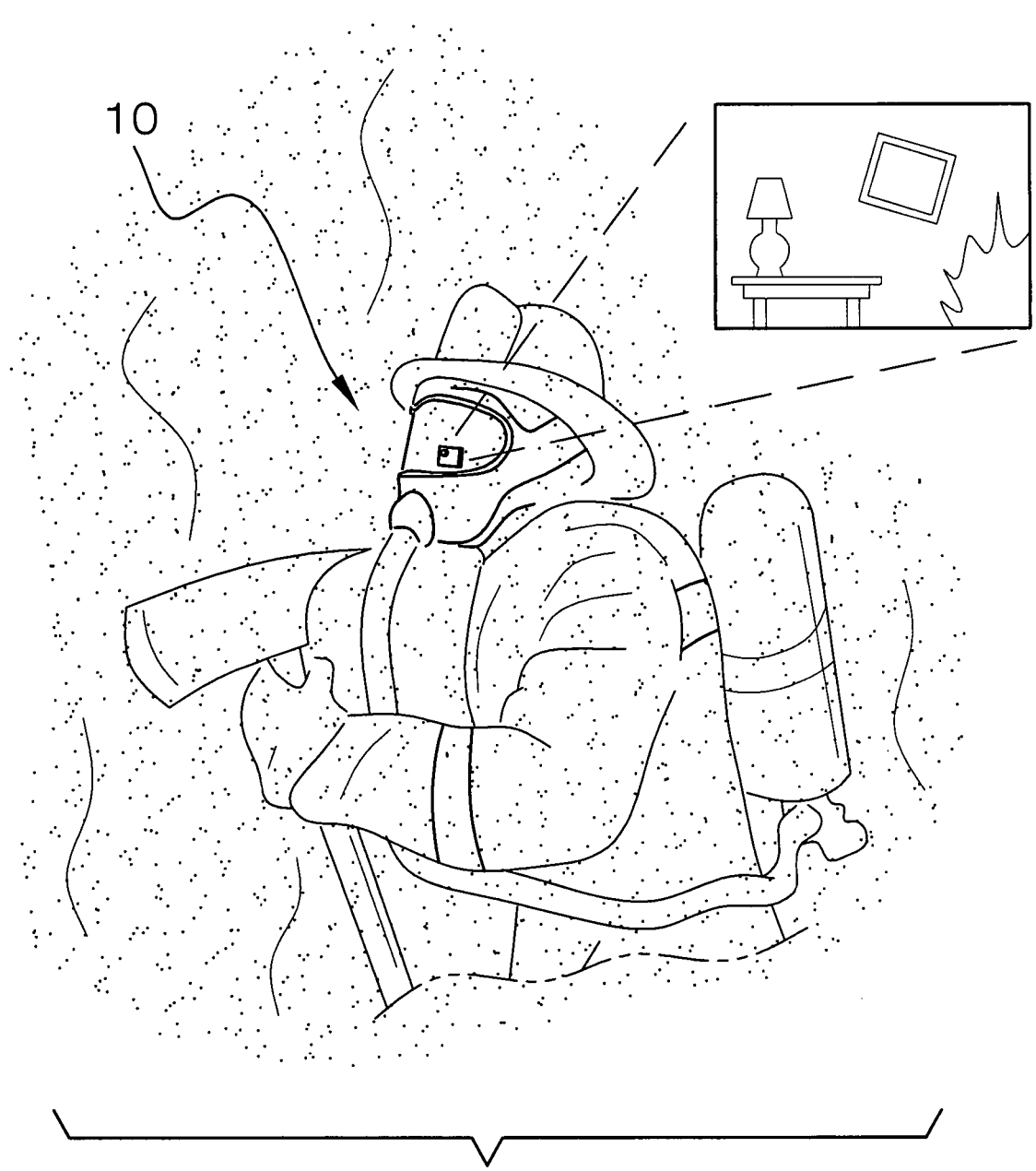
FIG. 5 illustrates the invention in use and depicting what the end user would visualize.

Detailed reference will now be made to the preferred embodiment of the present invention, examples of which are illustrated in FIGS. 1-5. An invention 10 comprises a visor 15 that has an opening to accommodate a thermal imaging system housing 16. The thermal imaging system housing 16 has a small LCD display 17, and a thermal imaging lens 18. Located within the thermal imaging system housing 16 is a battery supply 19, and a central processing unit (hereinafter CPU) 20. It is further asserted that the direction of the thermal imaging lens 18 can be adjusted to the desired angle of the end user. The range of direction of the thermal imaging lens 18 is +/−30 degrees in a swivel-like configuration.

The thermal imaging lens 18 generates a signal, which is transferred to the CPU 20. The CPU 20 then processes the signal, and transfers the signal to the LCD display 17. The LCD display 17 then projects the image onto its display.

The thermal imaging system housing 16 has a notch 22 that enables the thermal imaging system housing 16 to stay securely in place on the visor 15. An added precaution would be to apply a silicon sealant along the interface between the visor 15 and the thermal imaging system housing 16.

The thermal imaging system housing 16 is self-contained and sealed so as to insure safety, security, and quality to the end user.

The battery supply 19 can be accessed by a removable plate (not shown) that when removed provides access to the battery supply 19. The removable plate is secured to the thermal imaging system housing 16 by a fastening means consisting of a screw and an adhesive.

The above described arrangement enables the operator to utilize the information provided from the thermal camera while leaving his or her hands free to carry out other tasks.

Furthermore, the mounting of the thermal imaging system housing 16 provides a clear optical path between the LCD display 17 and the end user's eye (not shown). In other words, there is no likelihood of interference between the LCD display 17 and the end user's eye because the entire invention 10 is integrated within the visor 15, and therefore, no smoke should be able to cross said optical path.

It is further preferred that the arrangement enables only one eye of the wearer to view the output of the LCD display 17.

It is further preferred that the location of the thermal imaging system housing 16 be placed with respect to the visor 15, is below the eye-line of the end user.

The invention claimed is:

1. A thermal imaging device comprising:
   (a) a gas supplying mask assemblage with a front lens:
   (b) a thermal imaging system housing, which includes a liquid crystal display and a thermal imaging lens;
   wherein an opening in the front lens accommodates the thermal imaging system housing away from a direct line of sight;
   wherein the opening in the front lens is smaller than the front lens itself;
   wherein the thermal imaging lens is mounted to the thermal imaging system housing;
   wherein the thermal imaging lens can be rotated to the desired angle and line of sight of the end user, which will change the angle of view on the liquid crystal display;
   wherein the liquid crystal display is mounted to a side of the housing opposing the side that the thermal imaging lens is mounted;
   located within the thermal imaging system housing is a central processing unit and a battery supply;
   wherein the battery supply can be removed and installed so as to provide power to the thermal imaging system housing.

\* \* \* \* \*